June 16, 1964 W. D. GRAUE 3,137,652
FILTERS
Filed Dec. 6, 1960 2 Sheets-Sheet 1
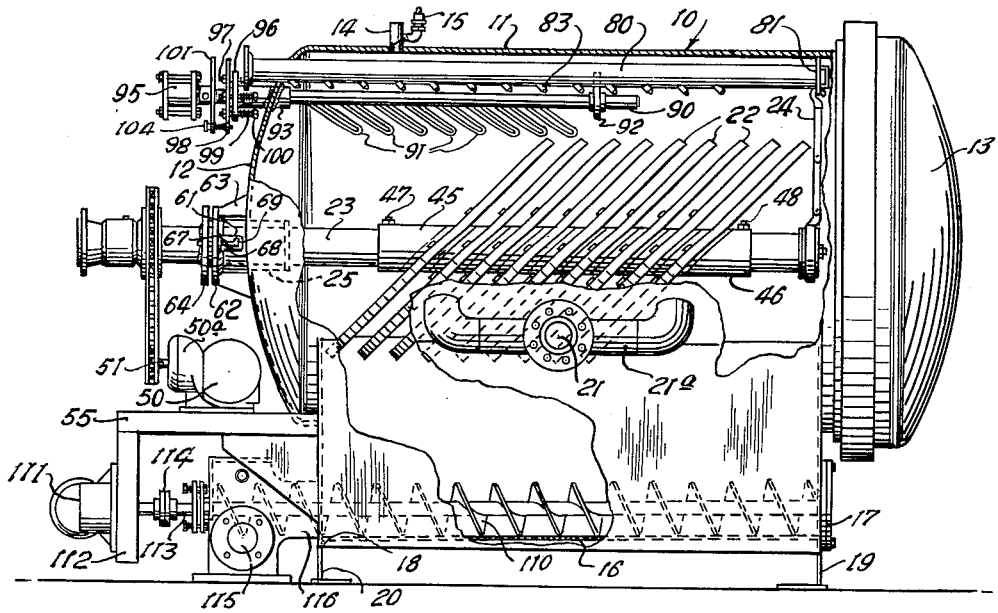
Fig. 1
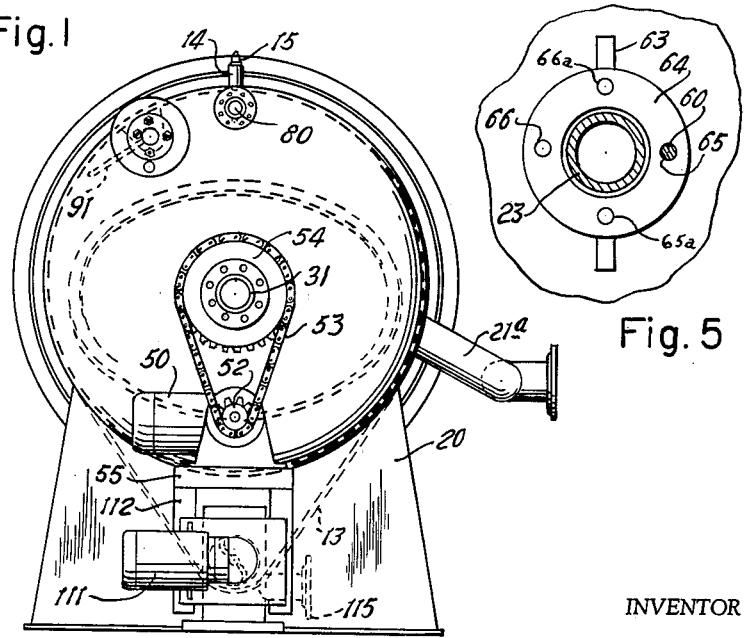
Fig. 2
Fig. 5
INVENTOR
William D. Graue
BY
ATTORNEYS June 16, 1964  W. D. GRAUE  3,137,652
FILTERS
Filed Dec. 6, 1960  2 Sheets-Sheet 2

INVENTOR
William D. Graue

BY
ATTORNEYS

United States Patent Office 3,137,652
Patented June 16, 1964

3,137,652
FILTERS
William D. Graue, 5833 Oram St., Dallas, Tex.
Filed Dec. 6, 1960, Ser. No. 74,069
5 Claims. (Cl. 210—331)

This invention relates to filters, and particularly to filters for filtering liquids.

An object of this invention is to provide a new and improved filter.

Another object is to provide a filter device including a filter tank with rotary filter elements therein whereby upon completion of the filtering operation the rotary filter elements may be halted in position with all their porous filtering surfaces facing upward so that deposits on such surfaces will not fall therefrom and contaminate the unfiltered liquid remaining in the tank.

Still another object is to provide a filter having a plurality of filter elements and sludge removal apparatus operational therewith comprising means for sluicing the sludge deposits on the filter elements and means for vibrating the individual filter elements to remove sludge therefrom, the sluicing means and vibrating means being employable either individually or in combination for providing efficient and speedy removal of sludge deposits.

A further object is to provide a filter device including a filter tank enclosing rotary filter elements wherein the filter elements may be stopped and held in either a position with all their porous filtering surfaces facing upward or in a position with all porous surfaces facing downward so that when such surfaces are in the upward facing position deposits of filtered out materials will not fall therefrom and contaminate unfiltered liquid remaining in the tank and so that such surfaces when in a downward facing position will permit such deposits to fall therefrom by gravity.

A still further object is to provide a filter apparatus having a tank wherein are disposed a plurality of filter leaf elements secured to a horizontal shaft at an angle from the vertical and having a porous filter surface on one side and a non-porous or imperforate surface on the other side whereby rotation of the shaft through 180 degrees causes the porous surfaces of the filter elements to be moved between upwardly and downwardly facing positions.

A still further object is to provide a filter including a tank wherein are disposed a plurality of filter leaf elements secured to a rotary horizontal shaft for rotation therewith, each filter leaf element being secured at an inclined angle to the shaft and having a porous filter surface on one side and an imperforate surface on the other; means for halting rotation of the shaft at the completion of filtering with all the porous filter surfaces facing upward to prevent deposits from falling therefrom into the unfiltered liquid remaining in the tank; and a means for removing deposits from the leaf elements which comprises a means for placing the leaf elements in position where all their filter surfaces face downward and apparatus cooperable with the leaf elements in this position for vibrating the elements or spraying the filter surfaces to accomplish an efficient removal of deposits.

A still further object is to provide a filtering appartus including a tank for enclosing filter leaf elements each having a porous filter surface on one side and an imperforate surface on the other and being secured to a rotatable shaft at an angle from the vertical whereby in normal filtering operation the leaf elements may be held disposed with their filter surfaces facing upwardly to prevent deposits falling off their filter surfaces and upon the completion of filtering may be oriented to vertical position upon rotating the shaft by a given angle so that deposits may be easily removed from the filter surfaces.

Additional objects and advantages of the invention will be readily apparent from the reading of the following description of a device constructed in accordance with the invention, and with refrence to the accompanying drawings thereof, wherein:

FIGURE 1 is a fragmentary side view of the filter with the filter tank partly broken away to disclose the arrangement of filter leaf elements on the hollow drive shaft;

FIGURE 2 is an end view of the filter;

FIGURE 5 is a fragmentary sectional view taken along the line 5—5 in FIGURE 3;

Figure 3:
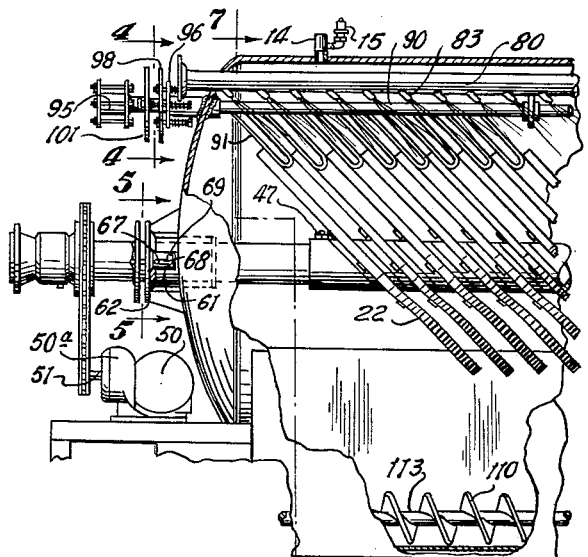
FIGURE 3 is a fragmentary side view of the filter with the filter tank partly broken away to disclose the arrangement of filter leaf elements and vibrator prongs during the sluicing operation.

Referring more particularly to FIGURE 1 of the drawings, the filter includes a large tank 10 having a main cylindrical portion 11. The tank has one end closed by a convex end member 12 integral with the main portion and has its other end closed by a quick opening door 13 which is latched to the cylindrical main portion by any suitable mechanism to afford quick access to the interior of the tank. The door is preferably of the type which utilizes the positive sealing action of a lip seal type gasket which tightens as internal tank pressure increases. An air vent 14 and a safety release valve 15 are mounted at the top of the tank to provide for releasing pressure from the tank when it exceeds a predetermined value. Intermediate the ends of the tank, a longitudinal V-shaped sludge trough 16 is disposed vertically beneath the tank to provide for drainage and removal of sludge. The upward flaring sides of the trough converge tangentially with the sides of the circular cylinder tank and are integrally formed therewith. However, the floor as formed at the apex of the V-shaped trough is higher at one end 17 than at the other so that liquid in the inclined trough will drain gravitationally toward the lower end 18. Upright standards 19 and 20 are formed with arcuate upper edges conforming with the circular exterior of the tank to support the tank. The upright supports also form the respective end walls of the V-shaped sludge trough.

The influent liquid to be filtered is delivered to the tank through an inlet nozzle 21 of a manifold 21a attached to the side of the tank and in fluid communication therewith. Circular filter elements 22 disposed in parallel array are attached to a rotating drive shaft 23 which passes axially through the center of each of filter element. The shaft is disposed centrally within the filter tank and is journalled and supported at one end by a bearing and toggle assembly 24 and by a bearing and shaft seal assembly 25 at the convex end 12 of the tank. Influent liquid passes into each of the filter elements to be filtered thereby and moves radially through each element into a hub 26, through the apertures 27 and 28 of the hub which are in alignment and in fluid communication with ports 29 and 30, respectively, of the central shaft and then through a shaft exhaust nozzle 31 into the main discharge lines, not shown, as the effluent filtrate.

Each individual filter leaf element has a nonporous or imperforate side or plate 32 in the form of a circular plate integrally formed with a hub 26 at its center and disposed at an angle to the axis of the hub and the central shaft. The filter elements are shown disposed at an angle of 45 degrees to the longitudinal axis of the shaft but of course may be disposed at other angles thereto as may be desired for use with particular filter media. Two layers 33 and 34 of a hardware cloth or a heavy mesh screen are disposed against the plate 32. A screen 35 is attached to each plate 32 by a circular retaining ring 36 disposed about the hub and central shaft. The retaining ring is bolted to the imperforate plate by bolts 37, 38 which extend through pairs of aligned apertures in the ring and the plate. Spacer pins 39 are inserted in bores in the plate adjacent the bolt receiving apertures so as to extend perpendicularly to the plate and space the ring at a distance from the imperforate plate. The spacer pins prevent crushing of the filter screens by the retainer ring so as to avoid obstruction of flow through the filter elements. A rim flange 41 on the circumferential periphery of the plate and an annular flange 42 adjacent the rim but spaced therefrom form an annular channel 43 in which the peripheral portion of the fine outer screen is disposed. The peripheral edges of the screen are crimped within the channel and held therein by a suitable mastic or sealing substance 44.

The hubs of the filter leaf elements are disposed on the central shaft in abutting relationship with one another so that the filter elements are parallel one to another and are equally spaced from one another. Sleeves 45 and 46 fastened to the shaft by threaded screws or bolts 47 and 48 at each end of the array of filter elements lock the filter elements in fixed position on the shaft.

The filter is adapted to use any type of filter media such as asbestos, diatomaceous earth, perlite, activated carbon or colloidal clays. These filter media are applied to the filter screens as a precoat either individually or in any particular combination depending upon the intended conditions of service. The use of asbestos is particularly favored for the filter described herein because it offers desirable characteristics not found in most other precoating materials or techniques. It tends to remain firmly on the screen through changes in flow or pressure, a feature which is particularly desirable in filters employing rotatable filter elements which are inclined to the vertical. Also, during the precoating phase preparatory to filtering, it forms evenly and quickly over the filter element screen surface without plugging and tends to break clean from the filter screen when its removal is desired. It is to be understood, of course, that in some filtering operations the use of special filter media other than the screens is unnecessary and precoating of the screens may be omitted.

The filter drive shaft may be driven by a motor 50 through a speed reducing train 50a. The output shaft 51 of the transmission has attached thereto a sprocket 52. A chain 53 extends about the sprocket 52 and a sprocket 54 mounted on the filter drive shaft. The motor is mounted on a horizontally extending bracket 55 attached to the upright support 18 at the end of the trough and the filter elements may then be slowly rotated by the motor. The unfiltered fluid supplied to the tank under pressure is then filtered by the many revolving filtering elements, the rotary movement of such elements assuring the relatively slow formation of a uniformly deposited cake of filtered out substances upon the filtering elements. In many cases, however, it is not desirable that the filter leaf elements be rotated during the filtering operation as may be determined by such factors as the nature of the unfiltered liquid and the type of filter media employed. In such instances, the drive means for rotating the shaft are not set in operation and the filter leaf elements and shaft are held in position against rotation with the leaf elements having their porous filter surfaces facing upwardly.

Figure 6:
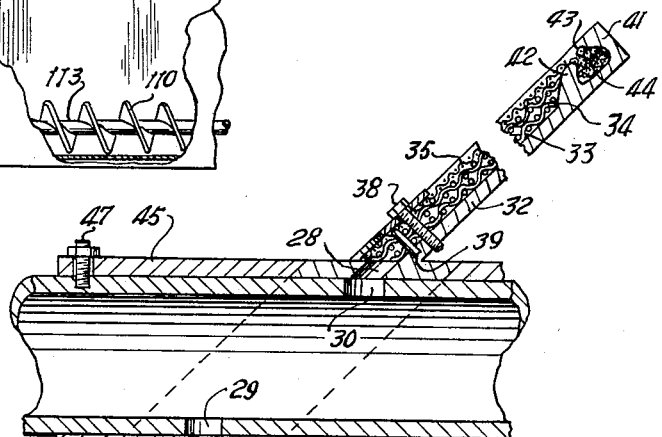
FIGURE 6 is a sectional view through the longitudinal axis of the filter drive shaft showing the connection of the filter leaf elements with the shaft.

When the shaft is in the position illustrated in FIGURES 1 and 6, the porous sides of the filter elements face upward and the layer of filtered out material rests upon the upward facing sides. In addition, the circular rim flange 41 provides a circular shoulder for the lowermost edges of the layer of filtered out material which also helps to support it. At the completion of the filtering operation it is desirable that the filter leaf elements be disposed in this position. In some operations they are held in this position but in other filtering operations wherein the leaf elements are rotated, the shaft is stopped and locked in position with the porous sides or screens 35 of the filter elements facing upwardly. The unfiltered liquid remaining in the tank may then be drained out through the trough and salvaged since the cake of filtered out material or sludge deposits on the porous filter surfaces will not fall off and contaminate the liquid.

When the liquid has been removed from the trough the shaft may then be rotated through 180 degrees to cause the porous sides of the filter elements to face downwardly while the non-porous sides face upwardly as shown in FIGURE 3. The filtered out material will then fall off the porous sides by gravity. The filter elements may then be vibrated and/or sprayed with a cleansing liquid to facilitate the removal of the cake or sludge.

A slide bolt 60 for locking the filter drive shaft against rotation is slidably mounted in a bolt sleeve 61 fastened to the bearing sleeve 25 exteriorly of the tank. The bolt sleeve extends parallel to the longitudinal axis of the shaft and is aligned with an aperture in a shaft encircling annular disk 62 which is rigidly attached to the convex end of the tank by brackets 63. The slide bolt may be moved outwardly of the bolt sleeve through the aperture in the disk 62. A similar annular disk 64 is mounted on the drive shaft adjacent the rigid disk 62 to rotate in a plane parallel with the plane of the disk 62 and is provided with a first pair of slide bolt accommodating apertures 65 and 66 and a second pair of slide bolt accommodating apertures 65a and 66a. The apertures 65 and 66 are diametrically opposed as are the apertures 65a and 66a and with the slide bolt accommodating aperture in the rigid disk 62 all of the apertures are equally radially distant from the drive shaft. The bolt may have an operator arm 67 which extends outwardly of the slot 68 of the bolt sleeve and the slot may have an angular extension 69 for receiving the arm 67 to hold the bolt in inoperative position. By sliding the latch bolt through the bolt accommodating aperture in the rigid disk and into any one of the apertures in the rotatable disk 64, the drive shaft and filter elements may be secured against rotation in preselected positions. The aperture 66 is so located that insertion of the latch bolt will lock the drive shaft with the filter elements in the position shown in FIGURE 1, i.e., with their cake encrusted porous sides facing upwardly. In this position, the sludge deposits will not fall into and contaminate the unfiltered liquid remaining in the tank so that at the completion of the filtering operation, this liquid may be drained off and salvaged.

By withdrawing the pin from the aperture 66, rotating the shaft by 180°, and inserting the pin in aperture 65, the filter drive shaft may be locked in the position shown in FIGURE 3 i.e., with the cake encrusted porous sides facing downward. When in this position, the sludge deposits on the filter elements may fall by gravity into the sump below.

To provide for a more thorough cleansing and removal of sludge, suitable apparatus for vibrating the elements or sluicing away the cake or sludge may be provided. A jet spray manifold 80 is disposed within the tank directly above the filter elements and the shaft 23. It is supported at one end by a vertical bracket 81 depending downwardly from the intermediate cylindrical portion of the tank and its other end portion extends through an aperture in the convex end plate 12 of the tank which provides an end support therefor. The pipe is equipped with spray jets 83 through which liquid is ejected at substantially 45° from the vertical. The jets are equally spaced and each is adapted to spray between a pair of filter elements when in the position illustrated in FIGURE 3. When in this position, the liquid ejected from the spray jets will effectively wash away deposits formed on the filter leaves.

As an alternative to the sluicing operation or in conjunction therewith, the filter elements, after having been rotated to a position wherein their encrusted porous sides face downwardly, may be subjected to vibration to shake away the deposits.

For this purpose, a vibrating shaft 90 carrying a number of prongs 91 equally spaced thereon is journalled at one end in a bracket 92 depending from the tank. Its other end portion passes through an aperture in the end 12 of the tank and is supported and rotatably journalled therein by a bearing sleeve and seal assembly 93 welded to the end of the tank.

During the filtering operation wherein the filter leaf elements are rotating with the drive shaft or are held against rotation with their porous surfaces facing upwardly, the vibrator prongs are pivoted out of filter element engaging positions to the inoperative positions illustrated in FIGURE 2. When it is desired to remove the sludge from the leaf elements, the filters are rotated on the filter drive shaft to a position where their porous sides face downwardly, as previously described. The vibrating shaft is then rotated to the position indicated in FIGURES 3 and 8 wherein a prong 91 is disposed between each pair of filter elements. The prongs depend from the vibrating shaft at the same angle as the filter elements extend from the filter drive shaft and each is adapted to engage the opposing faces of the pair of filter elements between which it is disposed. By means of a vibrator 95 located externally of the tank and attached to the end of the vibrating shaft 90, the vibrator may be operated to vibrate or reciprocate the shaft about a longitudinal axis, thus imparting vibrations to the prongs and the filter elements. The deposits on the under sides of the filter elements will thus be shaken free of the filters to fall into the sludge trough and be carried away.

The vibrator may be of the type which includes an impact shaft slidably disposed therein and in axial alignment with the vibrating shaft 90 to which it is rigidly attached so that longitudinal vibrations of the impact shaft are translated into longitudinal vibrations of the vibrating shaft. The vibrator may be hydraulically activated although other suitable vibrators for imparting longitudinal reciprocatory movements to the vibrating shaft may also be employed.

An annular disk 96 is rigidly attached to the bearing sleeve 93 and is concentric therewith, the disk extending radially from the sleeve axis. The disk 96 is provided with a number of bolts 97 disposed in an equal number of bolt accommodating apertures therein with the bolt shafts extending horizontally and parallel to the bearing sleeve and vibrating shaft 90. The bolt shafts are also slidably disposed in apertures in an annular disk 98 which is slidably attached to the portion of the shaft 90 which extends out of the bearing sleeve and exteriorly of the tank. The disk 98 has a hub portion, not shown, extending into the end of the bearing sleeve for retaining the packing in the sleeve and spacing the disk from the rigid disk 96. By means of coil springs 99 each of which is disposed about the shaft of a bolt 97 with one end abutting the disk 96 and its other end attached to a respective bolt head 100, the disk 98 is urged toward the bearing sleeve 93 to seal the packing therein. Hence, while the disk 98 may have a sliding longitudinal movement on the shaft 90 it is prevented from rotational movement by the attached bolts 97 which are slidably disposed in the rigid disk 96.

Figure 4:
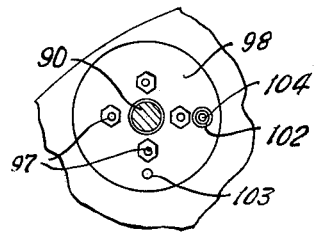
FIGURE 4 is a fragmentary sectional view taken along the line 4—4 in FIGURE 3.
Figures 7, 8:
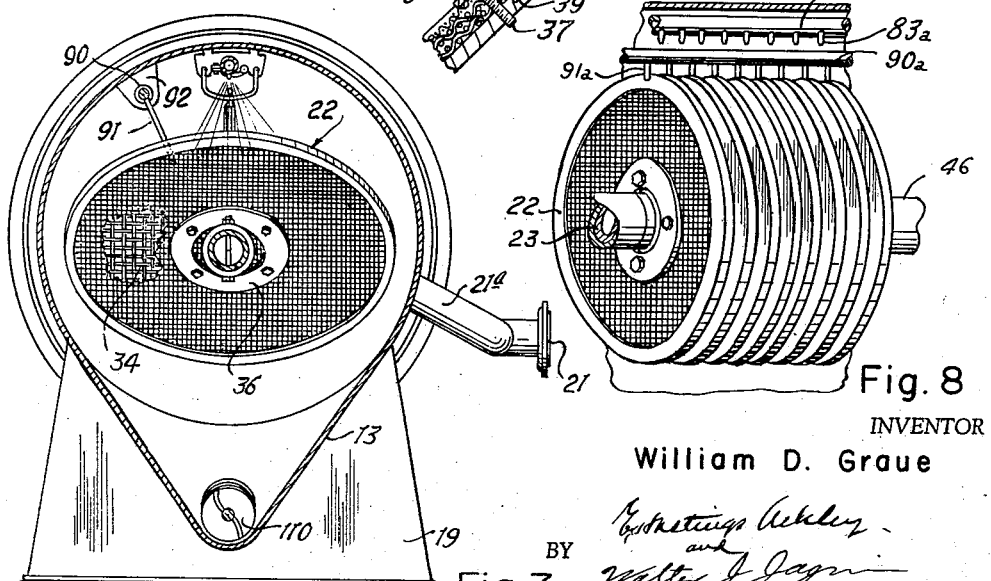
FIGURE 7 is a sectional view taken along the line 7—7 of FIGURE 3.
FIGURE 8 is a fragmentary side view of a modified form of filter with the tank partly broken away to disclose an arrangement of filter leaf elements and vibrator prongs wherein the leaf elements are disposed vertically during the sluicing operation.

To rotate the vibrating shaft and the prongs into and out of contact with the filter elements, an annular disk 101 is rigidly attached to the shaft to the left of the disk 98 as seen in FIGURE 3. By rotating the disk 101, the guides are rotated towards and away from the filter elements as desired. As illustrated in FIGURE 4, two apertures 102 and 103 are angularly displaced by 90 degrees on the disk 98. A stop pin 104 slidably disposed in an aperture in the disk 101 may be placed in either of the apertures 102 or 103, thus locking the vibrating shaft against rotation. When inserted in the aperture 102 as indicated in FIGURE 4, the vibrating shaft is in the rotational position where the prongs are disposed to engage the filter leaf elements as illustrated in FIGURES 3 and 7. When the stop pin of the disk 101 is inserted in the aperture 103, the prongs are in the inoperative position illustrated in FIGURE 1.

It will be seen that when the filter elements are disposed with porous sides downward, the position favorable for sludge removal, the sludge may be removed by turning on the jet sprays 83. Alternatively, the filter elements may also be vibrated by the guide prongs 91 to thereby effect a speedy and efficient removal of the sludge deposits.

The operation of the filter normally involves three phases—precoating of the filter leaf elements with filter media, filtering, and removal of deposits from the filter elements, although the precoating phase may be omitted in those filter operations wherein the use of special filter media applied to the screens is unnecessary. When asbestos is used in precoating, a given amount of asbestos fiber is mixed with a liquid in a precoat tank and pumped into the filter tank until it is filled. The liquid suspension then flows through the porous sides of the filter leaf elements, resulting in a uniformly deposited layer of asbestos on the screens in the form of a tight but porous mat. The filtrate is recirculated back to the precoat tank and recirculation through the filter is continued until all asbestos fiber is deposited on the screens. If the addition of a filter aid is required in the precoat, it is applied over the asbestos in the same manner as the original asbestos precoat was applied.

Upon completion of the precoating operation, the filter is prepared for the filter cycle. Unfiltered liquid is pumped into the tank through the inlet manifold and passes through the precoat layer on the porous side of each filter leaf due to the pressure differential existing across opposite sides of the precoat layer. The filtered liquid within the leaves moves radially through the coarse drainage screen into the leaf hub, through the holes in the central shaft, and thence out through the nozzle 31 into the main discharge lines as effluent filtrate.

During the filtering operation, a gradual buildup of filtered solids or slude is formed on the porous sides of the filter leaf elements resulting in a gradual increase in the pressure differential between tank inlet and outlet. When the differential exceeds a predetermined value at which the point of diminishing efficiency is reached, the filter cycle is stopped. The entral drive shaft, if it has not already been locked in place during a filtering operation wherein the porous sides of the filter leaf elements face upward, is stopped from rotating and locked in such position to prevent deposits falling into the drain trough. The unfiltered liquid which would otherwise be wasted by sludge falling therein, may then be drained away and saved for recirculation.

The filter is then prepared for sludge removal by rotating the drive shaft and the filter leaf elements 180 degrees so that the caked faces of the filter leaves face downwardly. The sluicing jets on the jet manifold may then be operated to wash away the sludge deposits or the vibrating shaft may be rotated into position to cause its prongs to engage the filter leaves and then vibrated. While either the jets or prongs may be used above, it is apparent that both may be operated simultaneously to sluice and vibrate the leaves. The sludge is drained from the inclined V-shaped trough and assisted in exiting therefrom by the screw conveyor 110 disposed in the bottom of the trough and parallel therewith. The screw conveyor is driven by an electric motor 111 mounted on a vertical extension 112 of the bracket 55 although other mounting means may be used. The motor drives the screw conveyor shaft 113 through a coupling 114 and rotates the screw to move the sludge through a drain 115 in a drainage conduit 116 at the lower end of the trough.

A modified form of filter apparatus is illustrated in FIGURE 8. In this embodiment the sludge removal phase of operation is accomplished with the filter leaf elements held in vertical position as may be more suitable for certain types of deposits. The embodiment differs structurally from the previous form of filter apparatus only in the arrangement of vibrator prongs on the vibrating shaft and the arrangement of jet spray nozzles on the spray manifold. In use, its operations are substantially identical with those of the previous embodiment. However, upon completion of filtering and salvage of the unfiltered liquid as remained in the tank, the drive shaft is rotated ninety degrees and is then locked in position by sliding the bolt 60 into either of the apertures 65a and 66a in the disk 64. With the drive shaft in this position, the filter leaf elements are disposed vertically and adapted to be vibrated for the removal of sludge deposits. The vibrating apparatus adapted to vibrate the vertical leaf elements includes the vibrating shaft 90a having vertically directed prongs 91a which are placed between the leaf elements by rotating the shaft 90a and locking the same when the prongs are in position. The shaft 91a is supported and journalled on the tank walls in the same relative position as the shaft 90 which requires that the prongs 91a be shorter than the prongs 91 since they cannot be swung between the leaf elements to the same degree as the prongs 91. The other components of the vibrating means, aside from the shaft and prongs are identical with those employed in the previous form of filter and are similarly operated.

The sluicing apparatus in the filter of FIGURE 8 is substantially identical with that employed in the filter apparatus illustrated in FIGURES 1 to 7 except for the arrangement and vertical direction of jet spray nozzles 83a on the jet spray manifold 80a. As with the previous form of filter apparatus, the jet sprays may be used alternatively with the vibrating apparatus or in conjunction therewith to accomplish the removal of sludge deposits.

It is apparent that the two embodiments of filter apparatus described herein differ only in the arrangement of vibrator prongs and jet spray nozzles. By replacing the vibrating shaft and jet spray manifold of one form of filter with those employed in the other, either embodiment of the filter may be readily converted to the other. It is to be appreciated, of course, that as an alternative to a different arrangement of prongs on the vibrating shaft in the filter of FIGURE 8, the vibrating shaft may be located relative to the filter drive shaft in a position oriented substantially ninety degrees from the position illustrated in FIGURE 2, the shafts being in parallel relationship as before. In this position, the same vibrating shaft and prongs are adapted for use in either form of filter apparatus.

It will be seen that the filter described herein provides rotatable filter elements to maintain a more constant pressure and uniform filter flow.

It will also be seen that the rotatable filter elements may be held against rotation with all filter surfaces facing upward so that deposits formed thereon will not fall off and contaminate the unfiltered liquid remaining in the tank.

It will further be seen that the vibrating and sluicing apparatuses will operate when the filter elements are disposed with their filter surfaces facing downward or in vertical position to facilitate an efficient and speedy removal of deposits.

It will further be seen that in the event of a power failure, while the filtering elements are being rotated and come to rest in a position wherein the porous filter surfaces do not face upwardly, the drive shaft may be rotated manually to the position where the porous filter surfaces face upwardly. If the filter elements are not being rotated at the time of power failure they are in the positions wherein they face upwardly. Power failure, of course, will result in loss of the pressure differential which holds the deposits and the precoat to the filter elements when the filter elements are not in the positions wherein their porous sides face upwardly. In this way, the deposits may be prevented from falling into the tank so as to preclude the necessity of cleaning the tank and replacing the precoat.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A filter comprising a tank having an inlet for liquid carrying material in suspension; a hollow shaft within and projecting from said tank to constitute an exhaust for filtered liquid; means for rotating said hollow shaft; a plurality of filter leaf elements each having a non-porous side and a porous filter side clamped throughout its periphery to the non-porous side and defining therewith a flow channel for filtered liquid, said filter leaf elements being attached to the shaft at an inclined angle to the longitudinal axis of the shaft whereby in one rotary position of the shaft all of the porous filter surfaces face upward; drainage fittings connected between the hollow shaft and the filter leaf elements for channeling filtered liquid from the leaf elements into the hollow shaft; and means for releasably holding the rotary shaft in said one rotary position where all porous filter surfaces face upwardly whereby deposits on the porous filter surfaces will not fall therefrom into the liquid in the tank.

2. A filter comprising a tank casing having an inlet for liquid carrying material in suspension; a hollow shaft within and projecting from said casing to constitute an exhaust for filtered liquid; means for rotating said hollow shaft; a plurality of filter leaf elements each having a non-porous side and a porous filter side clamped throughout its periphery to the non-porous side and defining therewith a flow channel for filtered liquid, said filter leaf elements being attached to the shaft at an inclined angle to the longitudinal axis of the shaft whereby in one rotary position of the shaft all of the porous filter surfaces of said filter leaf elements face upwardly; drainage fittings connected between the hollow shaft and said filter leaf elements for channeling filtered liquid from the filter leaf elements into said hollow shaft; means for holding the rotary shaft in said one position where all porous filter surfaces of said filter leaf elements face upwardly whereby deposits on the porous filter surfaces will not fall therefrom into the liquid in the casing; and means for holding the rotary shaft in a second position where all porous filter surfaces face downwardly whereby in the upward facing position of said porous filter surfaces sludge deposits will not fall from the porous surfaces to contaminate unfiltered liquid in the casing which may then be salvaged and whereby in the downward facing position of said porous surfaces sludge deposits may be readily removed from the porous surfaces.

3. A filter comprising a chamber means defining a chamber having an inlet for liquid carrying material in suspension and an outlet for unfiltered liquid; a shaft rotatably journaled on said chamber means; a plurality of filter leaf elements within said chamber, each having a non-porous side and a porous filter side spaced therefrom to define a flow channel for filtered liquid; means for mounting said plurality of filter leaf elements on said shaft at an inclined angle to the longitudinal axis of the shaft whereby in a first position of rotation all of the porous filter sides face upwardly and in a second position of rotation all of the porous filter sides face downwardly; drainage means connected to said filter leaf elements for channeling filtered liquid from the filter leaf elements to said outlet; means for selectively holding said shaft in said first and second rotary positions; and means for removing deposits from the porous sides of the filter leaf elements when the filter leaf elements are held in said second rotary position with their porous sides facing downwardly.

4. A filter comprising a tank casing having an inlet for liquid carrying material in suspension and an outlet for filtered liquid; a shaft rotatably journalled on said casing; a plurality of filter leaf elements within said casing, each having a non-porous side and a porous filter side spaced therefrom to define a flow channel for filtered liquid; means for mounting said plurality of filter leaf elements on said shaft at an inclined angle to the longitudinal axis of the shaft whereby in a first position of rotation all of the porous filter sides face upwardly and in a second position of rotation all of the porous filter sides face downwardly; drainage means connected to said filter leaf elements for channeling filtered liquid from the filter leaf elements to said outlet; means for selectively holding said shaft in said first and second rotary positions; and means for vibrating the filter leaf elements when in the position with their porous sides facing downwardly whereby deposits on the porous sides will be removed therefrom.

5. A filter comprising a chamber means defining a chamber having an inlet for liquid carrying material in suspension and an outlet for filtered liquid; a shaft rotatably journalled on said chamber means; a plurality of filter leaf elements within said chamber, each having a non-porous side and a porous filter side spaced therefrom to define a flow channel for filtered liquid; means for mounting said plurality of filter leaf elements on said shaft at an inclined angle to the longitudinal axis of the shaft whereby in a first position of rotation all of the porous filter sides face upwardly and in a second position of rotation all of the porous filter sides face downwardly; drainage means connected to said filter leaf elements for channeling filtered liquid from the filter leaf elements to said outlet; means for selectively holding said shaft in said first and second rotary positions; and means for spraying the porous sides of the filter leaf elements with liquid when in their downwardly facing position whereby deposits on the porous sides will be sluiced away.

References Cited in the file of this patent

UNITED STATES PATENTS

| | | |
|---|---|---|
| 985,611 | Lynch | Feb. 28, 1911 |
| 1,502,700 | Vallez | July 29, 1924 |
| 2,000,137 | Kelley | May 7, 1935 |
| 2,480,320 | Carrier | Aug. 30, 1949 |
| 2,780,364 | Teatini | Feb. 5, 1957 |
| 2,799,397 | Berline | July 16, 1957 |
| 2,874,848 | Cannon et al. | Feb. 24, 1959 |

FOREIGN PATENTS

| | | |
|---|---|---|
| 68,289 | Germany | Apr. 29, 1893 |
| 836,266 | Great Britain | June 1, 1960 |